(12) United States Patent
Reichelt et al.

(10) Patent No.: US 12,551,978 B2
(45) Date of Patent: Feb. 17, 2026

(54) METHOD FOR DETERMINING A PRESSURE DISTRIBUTION OF A MOLDING TOOL DEVICE AS WELL AS RESHAPING APPARATUS AND COMPOSITE SHEET METAL COMPONENT

(71) Applicant: Dr. Ing. h.c. F. Porsche Aktiengesellschaft, Stuttgart (DE)

(72) Inventors: Lars Reichelt, Wolkenstein (DE); Ronny Buehler, Neudenau-Siglingen (DE); Jonas Leubner, Loessnitz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 323 days.

(21) Appl. No.: 18/230,966

(22) Filed: Aug. 7, 2023

(65) Prior Publication Data

US 2024/0091896 A1 Mar. 21, 2024

(30) Foreign Application Priority Data

Sep. 21, 2022 (DE) ...................... 10 2022 124 171.8

(51) Int. Cl.
*B23Q 17/00* (2006.01)
*G01L 1/16* (2006.01)
*G01L 5/00* (2006.01)

(52) U.S. Cl.
CPC .............. *B23Q 17/005* (2013.01); *G01L 1/16* (2013.01); *G01L 5/008* (2013.01)

(58) Field of Classification Search
CPC ......... B23Q 17/005; G01L 1/16; G01L 5/008; G01L 1/18; G01L 5/167; B21D 26/031;
(Continued)

(56) References Cited

U.S. PATENT DOCUMENTS 4,741,231 A * 5/1988 Patterson ........... B23Q 17/0966
73/104

FOREIGN PATENT DOCUMENTS

DE 19925458 A1 * 12/2000 ............. B21D 37/00
DE 10300630 A1 * 7/2004 ............. B21D 37/00
(Continued)

OTHER PUBLICATIONS

Prod. Eng. Res. Devel. (2010) 4:379-384 DOI 10.1007/S11740-010-0255-0.

(Continued)

*Primary Examiner* — Octavia Hollington
(74) *Attorney, Agent, or Firm* — Buchanan Ingersoll & Rooney PC

(57) ABSTRACT

A method is provided for determining a pressure distribution of a molding tool device (1) for reshaping a sheet metal component (2). The pressure distribution represents a load on the sheet metal component (2) caused by reshaping in the molding tool device (1). The method includes introducing a piezoelectric material (3) into a raw material (12) of the sheet metal component (2) to form a composite sheet metal component (4) that provides an electrical voltage under mechanical loads. The method proceeds by arranging the composite sheet metal component (4) in the molding tool device (1) and reshaping the composite sheet metal component (4) with the molding tool device (1). The method then uses at least one sensor device (5) for detecting spatially resolved electric voltage signals that emanate from the composite sheet metal component (4) during the reshaping and determining the pressure distribution using the detected spatially resolved voltage signals.

7 Claims, 1 Drawing Sheet

(58) Field of Classification Search
CPC ........ B21D 22/00; B21D 22/02; B21D 28/14; B21D 37/20; B30B 15/161; B30B 15/22; B30B 15/26

See application file for complete search history.

(56) References Cited

FOREIGN PATENT DOCUMENTS

| | | | | |
|---|---|---|---|---|
| DE | 102012100096 A1 | * | 7/2013 | ............. G01N 29/14 |
| DE | 102012018606 A1 | * | 3/2014 | ............. B21D 24/04 |
| DE | 102017214378 A1 | * | 2/2019 | ............. G01B 11/25 |
| DE | 102019205052 A1 | * | 10/2020 | ............. B21C 51/00 |
| EP | 3041674 B1 | * | 8/2017 | ....... B29C 45/14311 |
| JP | 2000252536 A | * | 9/2000 | |

OTHER PUBLICATIONS

CIRP Annals—Manufacturing Technology 58 (2009) 279-282.
IEEE Sensors Journal, vol. 14, No. 7, Jul. 2014.
Journal of Materials Processing Technology 214 (2014) 217-228.
Mechatronics 34 (2016) 100-110.

* cited by examiner

METHOD FOR DETERMINING A PRESSURE DISTRIBUTION OF A MOLDING TOOL DEVICE AS WELL AS RESHAPING APPARATUS AND COMPOSITE SHEET METAL COMPONENT

CROSS REFERENCE TO RELATED APPLICATION

This application claims priority on German Patent Application No 10 2022 124 171.8 filed Sep. 21, 2022, the entire disclosure of which is incorporated herein by reference.

BACKGROUND

Field of the Invention

The invention relates to a method for determining a pressure distribution of a molding tool device for reshaping a sheet metal component. The pressure distribution represents a load on the sheet metal component caused by the reshaping in the molding tool device and often is referred to as a pressure pattern. The invention also relates to a reshaping apparatus and a composite sheet metal component.

Related Art

Pressure patterns are used commonly as part of the testing process of a cutting and/or reshaping tool, e.g. for the production of complex body parts of a motor vehicle. In addition, pressure patterns are also used to monitor a serial process.

The testing phase of a tool production process systematically presses and analyzes sheet metal components for different criteria (dimensional accuracy, burr, pressure pattern, etc.). The pressure pattern usually is a particularly relevant assessment criterion. For example, a pressure pattern is necessary to compensate for production-related tolerances of a milling of the tool surface and often regulates the sheet thinning.

A pressure pattern assessment usually covers the sheet metal component with blue marking ink prior to pressing. The sheet is examined after the reshaping or the pressing stroke to identify points at which the tool had contact with the sheet metal. These contact points are discernible via the color distribution or brightness of the color.

A brighter color distribution identifies areas that have a harder pressure band or contact between the tool and sheet metal. Accordingly, a brighter color distribution identifies areas with a higher spatial compressive load on the sheet metal component in the molding tool. Thus, the actual assessment or evaluation of the pressure pattern is a subjective process estimated by human sensation as to what proportion of the relevant surfaces is acceptable.

In light of the foregoing, a problem addressed by this invention is to provide an improved method for determining the pressure distribution. Preferably, it should be possible to assess the pressure distribution as objectively as possible.

Advantages and features of the invention are disclosed in the following description.

SUMMARY

The invention relates to determining a pressure distribution of a molding tool device. The molding tool device is used to reshape a sheet metal component. The pressure distribution represents a load on the sheet metal component caused by the reshaping in the molding tool device in a spatially resolved manner. The pressure distribution also can be referred to as a pressure pattern. The method comprises at least the following steps carried out in the indicated sequence or in another executable sequence. More particularly, the method includes introducing a piezoelectric material into a raw material of the sheet metal component to create a composite sheet metal component that can provide an electrical voltage under mechanical loads, such as a compressive load applied in the course of reshaping. The method further includes arranging the composite sheet metal component in the molding tool device and reshaping the composite sheet metal component with the molding tool device so that the composite sheet metal component receives the shape that is producible in accordance with the shape of the molding tool. The method then includes using at least one sensor device for detecting spatially resolved electric voltage signals that emanate from the composite sheet metal component during the reshaping and then determining the pressure distribution using the detected spatially resolved voltage signals.

The composite sheet metal component with the piezoelectric material advantageously enables manual tinting to be omitted entirely. Additionally, the pressure distribution is determined based on the spatially resolved voltage signals, and undesirable imperfections of the molding tool device can be evaluated objectively based on the measurements. This pressure distribution provides a significantly greater information content than a pressure pattern obtained by marking. Thus, the invention reliably determines where certain compressive loads occur during the reshaping. The method also determines the location, the number and the size of imperfections present in the molding tool device. As a result, a targeted post-processing of the molding tool can be carried out for optimization of the molding tool. At the same time, the sheet metal components produced are significantly more precise and have fewer tolerances, so that the waste can be reduced. In addition, monitoring in serial production can be designed significantly simpler and more reliably. Accordingly, the subjective (human) component can be supplemented or replaced by objective measurement in the assessment of the molding tool device.

Some embodiments may register the voltage signals as a function of time. Thus, a temporal progression and a temporal distribution of the compressive load during the reshaping can be determined in addition to the spatial distribution. More particularly, the pressure distribution can comprise a temporal progression of the compressive load. This aspect offers considerable advantages over a pressure pattern obtained by marking, in which only the end result is visible, and the temporal progression of the loads remains invisible. This embodiment, on the other hand, precisely determines the time and location at which particular compressive loads occur. The information content of the determined pressure distribution is expanded significantly and enables post-processing of the molding tool to be carried out in a more targeted manner.

The piezoelectric material may be embedded cohesively in the raw material of the sheet metal component. For example, the piezoelectric material may be embedded in a near-surface region or in a surface layer of the sheet metal component.

The piezoelectric material may be introduced into the raw material of the sheet metal component by way of edge layer dispersion. Other suitable and comparable methods are also possible for introducing the additional raw material into an edge layer of the sheet metal component or even deeper.

The piezoelectric material of some embodiments comprises piezoelectric particles. Each piezoelectric particle embedded in the composite sheet metal component may provide at least one measurement point. At least one voltage signal may proceed from each measurement point during the reshaping. The respective voltage signals of the measurement points can be tapped individually and/or spatially grouped with the sensor device during the reshaping. In other words, the respective voltage signal of at least a part of the measurement points are detected individually. It is also possible that not every measurement point is tapped individually.

The number of measured points depends, for example, on the concentration or surface density of the particles and/or desired resolution of the pressure distribution. In particular, the voltage signal of each measurement point is dependent on the level of the compressive load at the location of the measurement point, and the number of measurement points can be adjusted according to the desired resolution. In particular, the concentration of the particles is adjusted to achieve a desired resolution.

The sensor device of some embodiments is suitable and configured to detect the voltage signals individually and/or in spatially groups of at least a part of the measurement points. In particular, the sensor device comprises plural sensor elements that respectively detect at least the voltage signal of at least one measurement point. The number of sensor elements may correspond to the concentration of the particles and/or the number of measurement points.

The particles of some embodiments are smaller than 1 micrometer, and preferably smaller than 0.5 micrometers, and particularly preferably smaller than 200 nanometers. The particles may be nanoparticles smaller than 110 nanometers. In particular, the nanoparticles may be between 1 nanometer and 100 nanometers in size.

The molding tool device may comprise at least two opposing molding tools. In particular, the composite sheet metal component faces the at least two molding tools with at least one respective region. Voltage signals emanating from the regions are detected in a spatially resolved manner. The regions may comprise at least one upper side and at least one lower side. In particular, one molding tool is a tool upper part and the other molding tool is a tool lower part. In particular, the regions each have embedded piezoelectric material.

At least one sensor unit is associated with the respective molding tools of the sensor device. For example, the sensor device may comprise at least two sensor units, and each of the sensor units may be equipped with plural sensor elements.

The reshaping apparatus according to the invention is used for the method according to the invention and comprises at least one molding tool device for reshaping a sheet metal component. In particular, the reshaping apparatus comprises at least one sensor device for detecting spatially resolved electric voltage signals that emanate from a composite sheet metal component arranged in the molding tool device during reshaping. The molding tool device, the sensor device and the composite sheet metal component are configured as previously described.

The reshaping apparatus also is suitable and configured to carry out the method described above. For this purpose, the features formulated in a method-like manner can be read as apparatus features.

The composite sheet metal is used in the method described above. More particularly, the composite sheet metal component comprises at least one sheet metal component and at least one piezoelectric material incorporated into a raw material of the sheet metal component (preferably cohesively). In particular, the composite sheet metal component is suitable and configured to provide an electrical voltage under mechanical loads (in particular a compressive load in the context of its reshaping in the molding tool device). With the composite sheet metal component according to the invention, a molding tool device can be adapted reliably and inexpensively or monitored during the testing phase or even during serial operation. In particular, the composite sheet metal component is configured to be used in the method of the invention and preferably also in its configurations in accordance with the specification.

The sheet metal component may be produced by reshaping in the reshaping apparatus described above. More particularly, the sheet metal component may be produced by a molding tool device that has the pressure distribution determined by the above-described method. The sheet metal component may be an outer skin part of a body of a motor vehicle.

The detected spatially resolved voltage signals are converted into a pressure distribution. In particular, the pressure distribution represents a load on the composite sheet metal component during the reshaping process in the molding tool device in a spatially resolved manner. The pressure distribution on the sheet metal component (without the introduced piezoelectric material) can be derived from this pressure distribution. Spatially resolved means that at least one defined position on the composite sheet metal component and/or on the molding tool device can be derived from at least a (single) voltage signal. Determining the pressure distribution associates at least one detected voltage signal respectively with at least one spatial load.

The voltage signals may correspond to the voltage and/or at least one characteristic parameter for a voltage. In particular, the detection of the voltage signals takes place over at least a part of a tool surface of the molding tool device. The voltage signals are detected at least when the composite sheet metal component is under a compressive load in the molding tool device.

The voltage signal (e.g. the amount of the voltage) is dependent on the level of the compressive load. The voltage increases with increasing load and is provided only as long as the molding tool device applies a load on the composite sheet metal component. In particular, the detection of the voltage signals takes place at least during the compressive load.

The voltage signals depend on the load and preferably on a pressure acting on the composite sheet metal component. In particular, the pressure distribution describes spatial loads in the molding device and/or in the composite sheet metal component. The spatial loads are pressures or another suitable parameter. In particular, the voltage signals correspond to at least one spatial load each.

The spatial load is calculated from at least one detected voltage signal using a mapping algorithm that describes a relationship between the load and a parameter of the voltage signal, for example a voltage level. The allocation algorithm is stored in a control device. At least one position datum for the spatial allocation is assigned respectively to the voltage signals. The detected voltage signals are registered together with position data. In particular, the position data represent the spatial occurrence of the voltage signal and/or the spatial arrangement of the particle or measurement point with respect to the molding tool device and/or the composite sheet metal component.

The reshaping apparatus comprises at least one control device that is suitable and configured to carry out the determination of the pressure distribution using the detected, spatially resolved voltage signals and/or a temporal progression of the compressive load. The reshaping apparatus is suitable and configured to at least partially carry out the steps of the method presented herein. In particular, the production of the composite sheet metal component takes place outside of the reshaping apparatus.

The sensor device comprises sensor elements that respectively detect at least one voltage signal. The spatial position where the sensor elements detect their respective voltage signal is stored, and the pressure distribution is displayed and/or stored by means of an output device. For example, the pressure distribution can be visualized graphically and/or represented numerically.

The composite sheet metal component comprises the sheet metal component and the piezoelectric material. The sheet metal component can comprise an aluminum raw material or a steel raw material or a plastic raw material. The aluminum raw material comprises aluminum or an aluminum alloy, and the steel raw material comprises steel or a steel alloy. The sheet metal component can be made of a composite raw material that comprises at least one of the aforementioned raw materials.

Further advantages and features of the invention follow from the embodiments described below with reference to the accompanying drawings.

DETAILED DESCRIPTION

Figure 1:
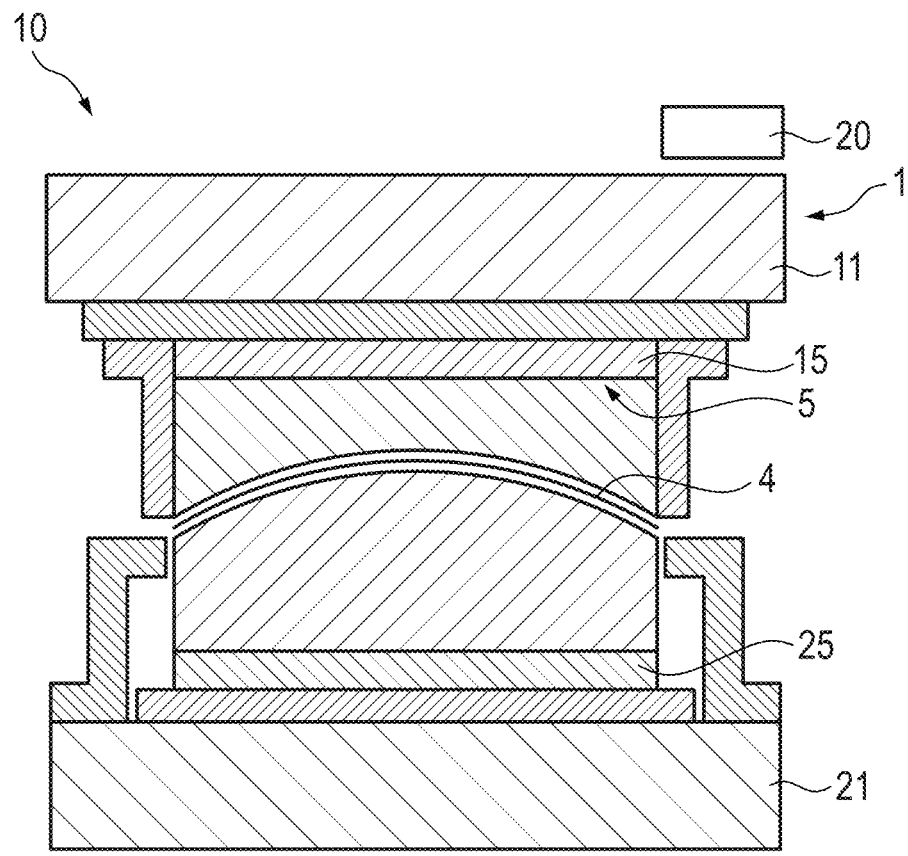
FIG. 1 is schematic illustration of a reshaping apparatus for use in the method of the invention.

FIG. 1 shows a reshaping apparatus 10 according to an embodiment of the invention for use with the method of the invention. The reshaping apparatus 10 comprises a molding tool device 1 with an upper molding tool 11 and a lower molding tool 21.

The reshaping apparatus 10 also comprises a sensor device 5 having upper and lower sensor units 15, 25. The upper sensor unit 15 is associated with the upper molding tool 11, and the lower sensor unit 25 is associated with the lower molding tool 21. The reshaping apparatus further comprises a control device 20. The functions described herein with respect to the control device 20 may be carried out through the use of dedicated hardware as well as hardware capable of executing software in association with appropriate software. In one embodiment, some or all of the functions may be performed by at least one processor, such as a computer or an electronic data processor, digital signal processor or embedded micro-controller, in accordance with code, such as computer program code, software, and/or integrated circuits that are coded to perform such functions, unless indicated otherwise. When provided by a processor, the functions may be provided by a single dedicated processor, by a single shared processor, or by a plurality of individual processors, some of which may be shared. Moreover, the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included in the control unit, such as a memory, input/output interfaces, a wireless transceiver, analog-to-digital converters, etc A composite sheet metal component 4 is located in the molding tooling 1 and comprises a sheet metal component 2 and a piezoelectric material 3 embedded in raw material 12 of the sheet metal component 2.

Figure 2:
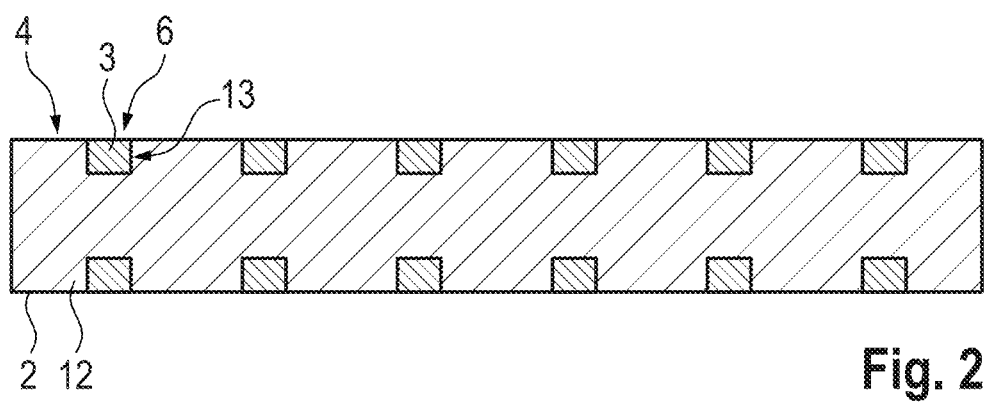
FIG. 2 is a schematic cross-sectional illustration of a composite sheet metal component for use in the method of the invention.

FIG. 2 shows the composite sheet metal component 4 in further detail. For better illustration, the dimensions shown here are not shown to scale. The raw material 12 of the sheet metal component 2 is an aluminum alloy, for example. However, a steel alloy or a plastic can also be used as a raw material 12 in an equally advantageous manner. The material 3 of this embodiment comprises piezoelectric particles 13 that provide at least one measurement point 6.

With reference to FIGS. 1 and 2, the performance of the method according to the invention and the reshaping apparatus 10 as well as the composite sheet metal component 4 are presented in detail below by way of example.

The composite sheet metal component 4 is placed between the two molding tools 11, 21 of the molding tool device 1, and the molding tools 11, 21 are closed to deform the composite sheet metal component 4. As a result, the molding tools 11, 21 create a load that causes the piezoelectric material 3 of the composite sheet metal component 4 to emit electrical voltages. The sensor device 5 detects these voltages as voltage signals in a spatially resolved manner and evaluates the signals to determine a spatial and temporal pressure distribution. For this purpose, a corresponding algorithm is stored in the control device 20, for example.

The sheet metal component 2 is enriched with the piezoelectric material 3 by surface layer dispersion or a similar method in which an additional raw material is introduced into the base raw material. This creates a hybrid composite raw material of a non-ferrous metal and the piezoelectric nanoparticles, namely the composite sheet metal component 4. The piezoelectric nanoparticles are characterized by the fact that a mechanical load of the molding tool device 1 or press produces an electrical voltage.

The concentration of the piezoelectric particles 13 or nanoparticles in the composite sheet metal component 4 are set here so that the prevailing loads in the molding tooling 1 also are distinguished electrically, and the resulting voltage can be detected by the sensor device 5. The electrical voltage increases with the mechanical load. In addition, only one electric voltage is produced as long as a mechanical load is applied to the composite sheet metal component 4. Thus, the load exerted on the composite sheet metal component 4 can be represented as a temporal progression.

Each particle 13 or nanoparticle serves as measurement point 6 and ultimately results in a cloud of points depending on the particle concentration. The denser this point cloud, the more meaningful the pressure pattern is. Sensor elements and, for example, finely tuned current sensors are present here in both the upper molding tool 11 and the lower molding tool 11. These sensor elements detect the electrical voltage in a contactless manner and can determine the position of each measurement point 6 due to the path-based voltage drop from the actuator to the sensor and thereby represent a "digital board" (e.g. graphics of the composite sheet metal component 4 with voltages or pressures in false colors). The voltage is ultimately reverse-calculated to a pressure. The pressure pattern can be detected without additional marking ink and thus only by the material properties.

Based on one or more pressure progressions or pressure patterns, the surface of the molding tool device 1 can then be optimized until a desired pressure progression has been achieved. After testing or in serial operation, a sheet metal component 2, which is intended to be used in accordance with the specification, is introduced into the molding tool device 1 instead of the composite sheet metal component 4. For monitoring, a composite sheet metal component 4 can be reshaped as needed, such that an up-to-date pressure pattern is present.

The invention presented here completely replaces the manual covering of a piece of sheet metal with marking ink. The pressure pattern on the component is made directly detectable via the material properties of the composite sheet metal component 4. The invention not only provides a snapshot of the pressure distribution, but also makes the entire reshaping process visible in the form of a pressure distribution or pressure curve.

The invention claimed is:

1. A method for determining a pressure distribution of a molding tool device (1) for reshaping a sheet metal component (2), wherein the pressure distribution represents a load on the sheet metal component (2) caused by reshaping in the molding tool device (1), the method comprising:
    introducing a piezoelectric material (3) into a raw material (12) of the sheet metal component (2) to form a composite sheet metal component (4) that provides an electrical voltage under mechanical loads;
    arranging the composite sheet metal component (4) in the molding tool device;
    reshaping the composite sheet metal component (4) with the molding tool device (1);
    using at least one sensor device (5) for detecting spatially resolved electric voltage signals that emanate from the composite sheet metal component (4) during the reshaping, by means of the at least one sensor device (5); and
    determining the pressure distribution using the detected spatially resolved voltage signals.

2. The method of claim 1, wherein the voltage signals are registered as a function of time, such that a temporal progression of a compressive load can be determined during the reshaping.

3. The method of claim 1, wherein introducing the piezoelectric material (3) into the raw material (12) of the sheet metal component (2) comprises cohesively embedding the piezoelectric material (3) in the raw material (12) of the sheet metal component (2).

4. The method of claim 1, wherein introducing the piezoelectric material (3) into the raw material (12) of the sheet metal component (2) comprises surface layer dispersion.

5. The method of claim 1, wherein the piezoelectric material (3) comprises particles (13) that define measurement points (6) from which voltage signals emanate, and wherein using at least one sensor device (5) for detecting spatially resolved electric voltage signals comprises individually tapping the voltage signals of the measurement points (6) with the sensor device (5) during the reshaping.

6. The method of claim 5, wherein the particles (13) are smaller than 1 micron.

7. The method of claim 1, wherein the molding tool device (1) comprises at least two opposing molding tools (11, 21) and wherein the composite sheet metal component (4) faces the at least two molding tools (11, 21) and wherein the voltage signals emanating from the composite sheet metal component (4) are detected in a spatially resolved manner.

\* \* \* \* \*